US012763305B2

(12) United States Patent
Corr et al.

(10) Patent No.: US 12,763,305 B2
(45) Date of Patent: Oct. 13, 2026

(54) INTEGRATED ELECTROSPRAY ION SOURCE

(71) Applicant: DH Technologies Development Pte. Ltd., Singapore (SG)

(72) Inventors: John J. Corr, Richmond Hill (CA); Thomas R. Covey, Newmarket (CA); Peter Kovarik, Markham (CA); Bradley B. Schneider, Bradford (CA)

(73) Assignee: DH Technologies Development Pte. Ltd., Singapore (SG)

( * ) Notice: Subject to any disclaimer, the term of this patent is extended or adjusted under 35 U.S.C. 154(b) by 473 days.

(21) Appl. No.: 18/298,881

(22) Filed: Apr. 11, 2023

(65) Prior Publication Data

US 2023/0245877 A1 Aug. 3, 2023

Related U.S. Application Data

(62) Division of application No. 16/971,436, filed as application No. PCT/IB2019/051382 on Feb. 20, 2019, now Pat. No. 11,664,210.

(60) Provisional application No. 62/805,088, filed on Feb. 13, 2019, provisional application No. 62/633,459, filed on Feb. 21, 2018, provisional application No. 62/632,863, filed on Feb. 20, 2018.

(51) Int. Cl.

| | |
|---|---|
| ***H01J 49/10*** | (2006.01) |
| ***H01J 49/00*** | (2006.01) |
| ***H01J 49/16*** | (2006.01) |

(52) U.S. Cl.

CPC ........ *H01J 49/107* (2013.01); *H01J 49/0031* (2013.01); *H01J 49/165* (2013.01)

(58) Field of Classification Search

CPC ..... H01J 49/107; H01J 49/0031; H01J 49/165
USPC .............................. 250/281, 282, 288, 493.1
See application file for complete search history.

(56) References Cited

U.S. PATENT DOCUMENTS

| | | |
|---|---|---|
| 5,495,108 A | 2/1996 | Apffel, Jr. et al. |
| 6,207,954 B1 | 3/2001 | Andrien, Jr. et al. |

(Continued)

FOREIGN PATENT DOCUMENTS

| | | |
|---|---|---|
| JP | 2009294086 A | 12/2009 |

OTHER PUBLICATIONS

International Search Report and Written Opinion for PCT/IB2019/051382 mailed Jun. 13, 2019.

(Continued)

*Primary Examiner* — Michael Maskell
(74) *Attorney, Agent, or Firm* — Potomac Law Group, PLLC; Reza Mollaaghababa; Brian J. Hairston

(57) ABSTRACT

In one aspect, an ion source for use in a mass spectrometry system is disclosed, which comprises a housing, a first and a second ion probe coupled to said housing, and a first and a second emitter configured for coupling, respectively, to said first and second ion probes. The first ion probe is configured for receiving a sample at a flow rate in nanoflow regime and the second ion probe is configured for receiving a sample at a flow rate above the nanoflow regime. Each of the ion probes includes a discharge end (herein also referred to as the discharge tip) for ionizing at least one constituent of the received sample. In some embodiment, each ion probe receives the sample from a liquid chromatography (LC) column. Further, the ion probes can be interchangeably disposed within the housing.

27 Claims, 11 Drawing Sheets

(56) References Cited

U.S. PATENT DOCUMENTS

| | | | | |
|---|---|---|---|---|
| 6,326,616 | B1 | 12/2001 | Andrien, Jr. et al. | |
| 6,337,480 | B1 | 1/2002 | Andrien, Jr. et al. | |
| 6,410,914 | B1 | 6/2002 | Park et al. | |
| 10,222,812 | B2 | 3/2019 | Shu | |
| 10,975,970 | B2 | 4/2021 | Shu | |
| 11,280,418 | B2 | 3/2022 | Shu | |
| 11,306,750 | B2 | 4/2022 | Shu | |
| 11,428,211 | B1 | 8/2022 | Shu | |
| 11,664,210 | B2 * | 5/2023 | Corr .................... | H01J 49/0031<br>250/282 |
| 2001/0013579 | A1 * | 8/2001 | Andrien, Jr. ........ | H01J 49/0009<br>250/423 R |
| 2004/0094706 | A1 * | 5/2004 | Covey ..................... | H01J 49/04<br>250/288 |
| 2006/0255261 | A1 | 11/2006 | Whitehouse et al. | |
| 2011/0049348 | A1 | 3/2011 | Wells | |
| 2016/0225601 | A1 | 8/2016 | Bajic et al. | |
| 2017/0032949 | A1 | 2/2017 | Covey et al. | |
| 2017/0294296 | A1 | 10/2017 | Trivett et al. | |

OTHER PUBLICATIONS

Drouin Nicolas et al: "Improved CE/MS Sensitivity by Operating the Triple-Tube Coaxial Sheath-Flow Sprayer Without Appling Nebulizing Gas Introduction", Technical Overview, Mar. 1, 2018, pp. 1-6.

Unknown, "H-ESI Probe User Guide (Doc. No. 97055-97045; Revision B)", Mar. 1, 2008 , pp. 32.

* cited by examiner

INTEGRATED ELECTROSPRAY ION SOURCE

RELATED APPLICATIONS

This application claims is a division of U.S. application Ser. No. 16/971,436 filed on Aug. 20, 2020, entitled "Integrated Electrospray Ion Source," which is a 371 of international application PCT/IB2019/051382 filed on Feb. 20, 2019, entitled "Integrated Electrospray Ion Source," which claims priority to U.S. provisional application No. 62/632,863 filed on Feb. 20, 2018, entitled "Integrated Electrospray Ion Source," and to U.S. provisional application No. 62/633,459 filed on Feb. 21, 2018, entitled "Integrated Electrospray Ion Source," and to U.S. provisional application No. 62/805,088 filed on Feb. 13, 2019, entitled "Integrated Electrospray Ion Source," the disclosures of which are incorporated herein by reference in their entireties.

INTRODUCTION

The present invention relates generally to an ion source and more particularly to an electrospray ion source that can accommodate various sample flow rates.

Mass spectrometry (MS) is an analytical technique for measuring mass-to-charge ratios of molecules, with both qualitative and quantitative applications. MS can be useful for identifying unknown compounds, determining the structure of a particular compound by observing its fragmentation, and quantifying the amount of a particular compound in a sample. Mass spectrometers detect chemical entities as ions such that a conversion of the analytes to charged ions must occur during sample processing.

A variety of methods are known for ionizing chemical entities within a liquid sample into charged ions suitable for detection with MS. One of the more common ionization methods is electrospray ionization (ESI). In a typical ESI process, a liquid sample is discharged into an ionization chamber via an electrically conductive needle, electrospray electrode, or nozzle, while an electric potential difference between the electrospray electrode and a counter electrode generates a strong electric field within the ionization chamber that electrically charges the liquid sample. The electric field generated within the ionization chamber causes the liquid discharged from the electrospray electrode, needle or nozzle to disperse into a plurality of charged microdroplets drawn toward the counter electrode if the charge imposed on the liquid's surface is strong enough to overcome the surface tension of the liquid. As solvent within the microdroplets evaporates during desolvation in the ionization chamber, charged analyte ions can enter a sampling orifice of the counter electrode for subsequent mass spectrometric analysis.

In conventional ion sources, optimization of sensitivity performance requires the user to successfully adjust approximately seven interacting parameters, several of which involve physical adjustments within the source and others which can involve software-settable parameters such as temperature, electrical potential, and gas flows. These parameters are highly dependent on the flow rate of the liquid sample stream. As an example, as flow rate increases the location of the probe tip relative to the entrance aperture of the mass spectrometer is usually increased, ion source temperature is increased, electrospray ionization electrical potential is optimized differently, and nebulization and heat transfer gas flows are increased. Additionally, the protrusion of the emitter from the discharge end of the probe often requires adjustment, which in turn requires re-optimization of nebulization gas and ESI electrical potential. An optimal set of parameters exists for each flow rate. When optimizing for sensitivity performance for a particular flow rate, each adjustment of the vertical position of the probe can trigger readjustment of ion source temperature, gas flows and ESI electrical potential. Sensitivity performance optimization can be further complicated when the user attempts to determine optimal operational parameters for a mixture of compounds. In general, it is not possible to determine a single set of operational parameters which would produce optimal sensitivity for all compounds in a mixture, and the "optimal" parameters usually involve a performance compromise for a subset of the compounds in the mixture. As such, obtaining optimal performance with a conventional ion source is time consuming and can be difficult, even for experienced users.

Further, an ion probe of an electrospray ionization source can receive samples, for example, from an upstream liquid chromatography (LC) column, at flow rates within a particular range. If flow rates above or below that range are desired, the ion probe must be replaced with another probe that can accommodate the desired flow rates. Such replacement of probes can be, however, cumbersome and time consuming.

Accordingly, there is a need for enhanced ion sources, and more particularly for enhanced electrospray ion sources for use in mass spectrometry.

SUMMARY

In one aspect, an ion source for use in a mass spectrometry system is disclosed, which comprises a housing providing first and second openings, where the first opening is configured for coupling a first ion probe accommodating sample flow rates in a nanoflow regime to the housing and the second opening is configured for coupling a second ion probe accommodating sample flow rates above nanoflow regime to the housing. The ion probes can be independently coupled to the housing such that the ion source can be operated with only the first or the second ion probe coupled to the housing or with both ion probes coupled to the housing. Each of the ion probes includes a discharge end (herein also referred to as the discharge tip) for ionizing at least one constituent of the received sample. Each ion probe includes an emitter, which is fixedly (non-adjustably) positioned relative to the discharge end of the probe. Specifically, in many embodiments, the emitter of each probe extends out of the probe body at the discharge end by a fixed amount, which is not adjustable by a user. In other words, the emitter of each probe has a portion that extends beyond the discharge end of the probe and the length of this external portion of the emitter is non-adjustable by a user. As such, the present teachings can eliminate the need for physical adjustments of the ion probes, which are often the most difficult aspects of ion source optimization, thus reducing the tediousness associated with ion source optimization as well as saving time.

In some embodiments, each ion probe receives the sample from a liquid chromatography (LC) column. Further, the ion probes can be interchangeably disposed within the housing.

In some embodiments, the first and the second ion probes are disposed at an angle relative to one another. For example, the angle between the longitudinal axes of the ion probes can be about 90 degrees.

In some embodiments, the housing of the ion source is coupled to a curtain plate of a mass spectrometer, where the curtain plate includes an orifice through which at least a portion of the ions generated by any of the first and second ion probes can enter downstream components of the mass spectrometer. In such embodiments, the openings in the housing can be configured such that the first ion probe is positioned in the housing such that a longitudinal axis thereof is substantially co-axial with a central axis associated with the orifice of the curtain plate and the second ion probe is positioned in the housing such that a longitudinal axis thereof is substantially orthogonal to the orifice axis.

Further, in some embodiments, the first and the second probes can be positioned in the housing such that the discharge tips thereof are non-adjustably disposed relative to the orifice of the curtain plate. In other words, in such embodiments, the orientation and the distance of the discharge tips of the probes relative to the orifice of the curtain plate are fixed and cannot be adjusted by a user.

The ion source can be operable with any of the first and second ion probes. For example, when using an LC column providing flow rates in the nanoflow regime, the first ion probe can be coupled to the LC column to receive a sample therefrom and when using an LC column providing sample flow rates above the nanoflow regime, the second ion probe can be coupled to the LC column to receive a sample therefrom. In some embodiments, the first ion probe can be coupled to the housing and the opening associated with the second ion probe can be plugged. In another embodiment, the second ion probe can be coupled to the housing and the opening associated with the first ion probe can be plugged. In such embodiments, the ion source can be operated with only one of the ion probes.

In some embodiments, the ion source can include at least one heater coupled to the housing that can be employed to cause desolvation of charged microdroplets generated by the ion probes to assist in ionization of a sample received by the probes. In some such embodiments, the ion source can include two heaters, where the heaters are disposed non-coaxially relative to a longitudinal axis of at least one of the ion probes. Further, in some such embodiments, the heaters and at least one of the probes are arranged in a non-coplanar configuration. The heaters can provide temperature control over the sample path between each emitter and a sampling orifice.

In some embodiments, each of the first and the second ion probes is an electrospray ion probe. By way of example, each of the first and the second ion probes can be a nebulization-assisted ion probe. For example, such an ion probe can include a housing having a channel in which an emitter is installed. The emitter can include a lumen extending from a proximal end, through which a sample can be introduced into the probe (e.g., from an LC column), to a distal end that extends out of the probe and at which ionization of one or more constituents of the sample can occur. The probe's housing can include a port for introducing a nebulization gas into the channel of the probe's housing so as to assist in generating droplets at the discharge end of the probe.

In a related aspect, a mass spectrometer system is disclosed, which comprises an ion source for generating ions, a curtain plate having an orifice for receiving at least a portion of the ions, and one or more mass analyzers disposed downstream of said orifice of the curtain plate. The ion source comprises a housing that provides first and second openings, where the first opening is configured for coupling a first ion probe accommodating sample flow rates in a nanoflow regime to the housing and the second opening is configured for coupling a second ion probe accommodating sample flow rates in a range above nanoflow range to the housing. Each of the ion probes comprises an emitter for ionizing at least one constituent of a sample flowing through the ion probe.

In the above embodiment, the ion probes can be positioned in the housing such that a discharge tip of each probe is positioned fixedly (non-adjustably) relative to the orifice of the curtain plate. In some embodiments, the ion probes can be positioned relative to an inlet of a downstream mass analyzer such that at least a portion of the ions generated by the ion probes can be received by the inlet, which can be in some embodiments an aperture or a heated capillary.

In another aspect, a process for ionizing a sample is disclosed, which comprises coupling at least one of a first and a second ion probe to a housing of an ion source via a first and a second opening, respectively, provided in the housing, where the first ion probe is configured for accommodating sample flow rates in nanoflow range and the second ion probe is configured for accommodating sample flow rates in a range above the nanoflow range. Each of the ion probes has an emitter for ionizing the sample. The method further includes introducing a sample into at least one of said first and second ion probes, and activating the emitter of said at least one of said first and second ion probes so as to ionize at least a constituent of said sample. The at least one ion probe can be coupled to a mass analyzer via an orifice of a curtain plate. In some embodiments, the at least one ion probe can be fixedly positioned relative to the orifice of the curtain plate.

In another embodiment, a mass spectrometer to which the ion source having the ion probes are coupled can include circuitry for recognizing which ion probe is coupled to the ion source. For example, in some such embodiments, an opening in the housing to which an ion probe is not coupled (i.e., the non-functional opening) can be plugged by a cap having a resistive element, which the circuitry can read to determine that the opening is non-functional. In some such embodiments, each ion probe can include an identification electrical resistance, which differs from an identification electrical resistance of the other probe. In some embodiments, the resistances of the probes can be in series when the two probes are coupled to the ion source housing. Further, a cap utilized to plug a non-functional opening can cause an electrical short circuit across that opening. In some such embodiments, a resistance-measuring device can measure the series resistance across the openings and a controller can receive the measured resistance and determine if any of the probes is coupled to the housing, if so, identify the probe that is coupled to the housing. For example, a measured resistance indicating a resistance associated with the probe accommodating flow rates in the nanoflow range indicates that the probe accommodating nanoflow rates is coupled to the housing. The controller can be in communication with a power supply that supplies power to the probes. The controller can control the power supply, based on the received measurements of electrical resistance, to provide appropriate power to the probe that is coupled to the housing. In cases, where the controller determines, based on the received resistance measurements, that neither probe is coupled to the housing, the controller can inhibit the power supply from applying power to the probes. The system recognition of the probes can utilize any technique as known in the art, i.e., digital, analog, optical, electrical, or mechanical. Furthermore, the cap can serve an additional purpose of sealing the ion source housing to prevent leakage of sample vapors into the lab environment. The source can include an exhaust port which can be actively pumped to remove gaseous byproducts, as well as additional gas flows such as a bath gas to control source pressure.

In another aspect, a process for ionizing a sample is disclosed, which comprises providing a first electrospray ion probe configured for accommodating a sample flow rate in a nanoflow range, said probe having a first emitter for ionizing said sample, and providing a second electrospray ion probe configured for accommodating a sample flow rate in a range above said nanoflow range, said probe having a second emitter for ionizing said sample. In some embodiments of the above method, a discharge tip of the emitter of each of the ion probes is non-adjustably positioned relative to a discharge end of the probe.

The process can further include introducing a sample into at least one of said first or second ionization probes and activating the emitter of the ionization probe so as to ionize at least a constituent of said sample.

Further understanding of various aspects of the invention can be obtained by reference to the following detailed description in conjunction with the associated drawings, which are described briefly below.

DETAILED DESCRIPTION

The present teachings are generally directed to an electrospray ion source for use in a mass spectrometry system, which can accommodate a wide range of sample flow rates, such as sample flow rates in the nanoflow regime and above the nanoflow regime. As discussed in more detail below, in many embodiments, the ion source can include two ion probes disposed in a housing, where one of the ion probes is configured to accommodate sample flow rates in the nanoflow regime and the other ion probe is configured to accommodate sample flow rates above the nanoflow regime.

Various terms are employed herein consistent with their customary meanings in the art. By way of further clarification, the following terms are defined:

The terms "nanoflow range" or "nanoflow regime" refer to flow rates less than about 1000 nanoliters/min, e.g., in a range of about 1 nanoliter/min to about 1000 nanoliters/min.

The term "about" as used herein, for example, to modify a numerical value, is intended to indicate a variation of at most 5 percent.

The term "substantially" as used herein refers to a deviation of at most 5 percent relative to a complete condition and/or state.

The term "fixedly positioned" as referring to an element indicates that the position of that element is not adjustable by a user.

FIGS. 1A, 1B, 1C and 1D schematically depict an ion source 10 according to an embodiment of the present teachings that includes a housing 12 providing two openings or ports 12*a* and 12*b* for coupling two ion probes to the housing. In this embodiment, two ion probes 14 and 16 are disposed in the housing 12 via the ports 12*a* and 12*b*. As discussed in more detail below, in other embodiments, only one of the ion probes 14 and 16 can be coupled to the housing via one of the ports and the other port can be plugged. In other words, the ion source 10 can be configured to operate with both ion probes or with only one of the ion probes. As discussed in more detail below, one advantage of the ion source 10 is that it allows for easy removal and replacement of the ion probes such that the ion source can be configured to operate with either or both of the ion probes.

The ions probes 14 and 16 are configured to generate ions via electrospray ionization. As discussed in more detail below, the ion source 10 can be incorporated in a variety of different mass spectrometers for generating ions. Further, as discussed in more detail below, the ion source 10 is configured to accommodate different flow rates of samples to be ionized, including flow rates in the nanoflow range as well as above the nanoflow range. By way of example, the flow rates above the nanoflow range can be greater than 1000 nanoliters/min to about 3 milliliters/min.

Figure 1A:
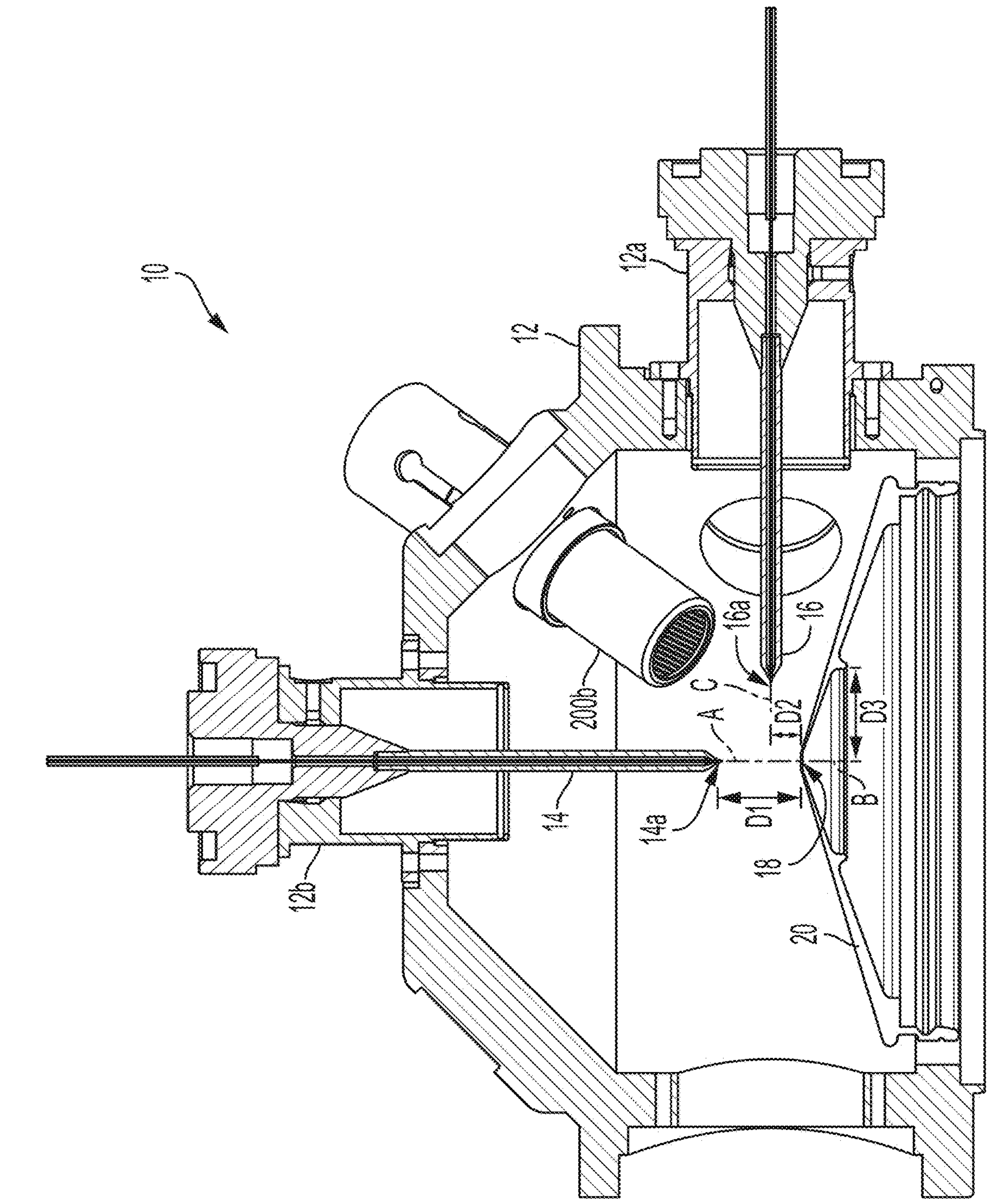
FIG. 1A schematically depicts an ion source according to an embodiment interfaced with a curtain plate of a mass spectrometer, where the ion source includes two electrospray ion probes configured for accommodating different sample flow rates.
Figure 1C:
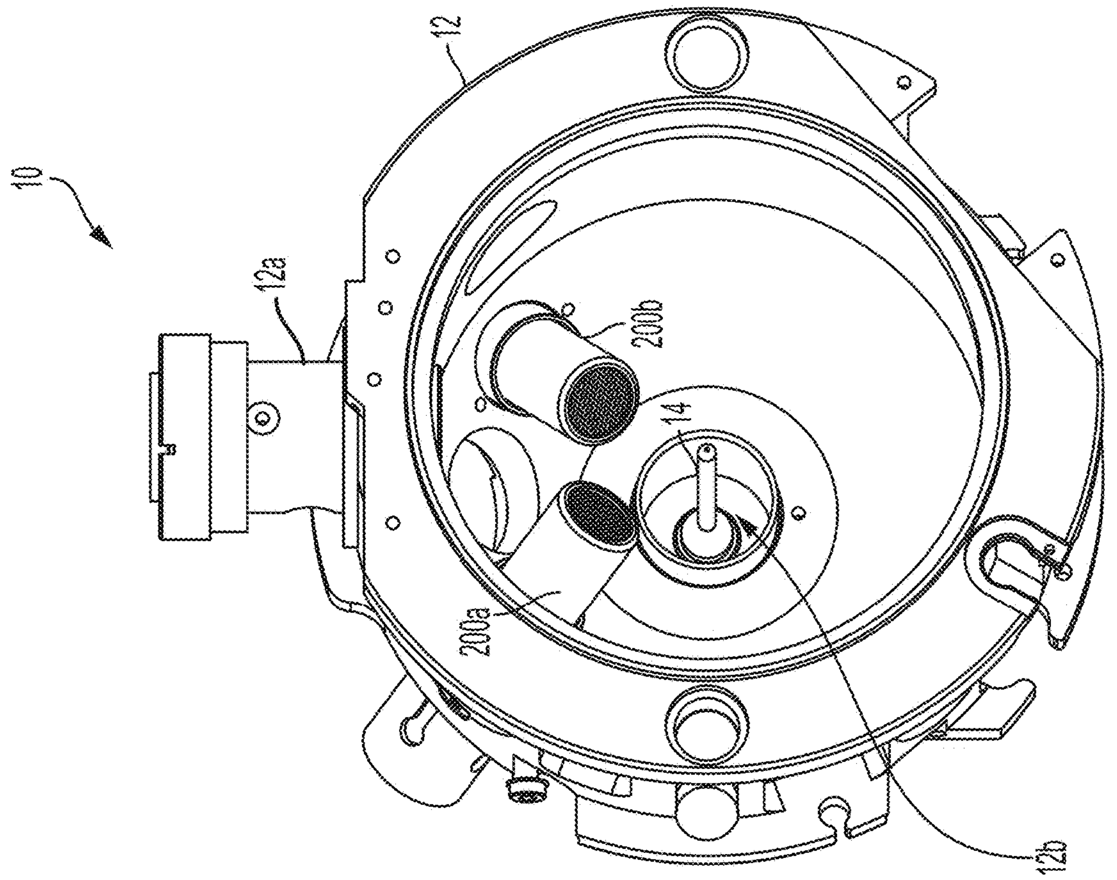
FIG. 1C is another schematic view of the ion source depicted in FIG. 1A showing the ion probe accommodating flow rates in the nanoflow range and the two heaters.

Referring to FIG. 1A, in this embodiment, the ion probes 14 and 16 are positioned relative to an aperture 18 of a curtain plate 20 of a mass spectrometer in which the ion source is incorporated such that at least some of the ions generated by the probes 14/16 would pass through the aperture (orifice) 18 to reach the downstream components of a mass spectrometer, such as downstream mass analyzers.

The ion probe 14 is configured to accommodate sample flow rates in the nanoflow range. For example, in embodiments in which the ion probe 14 is coupled to a liquid chromatography (LC) column to receive a sample therefrom, the rate at which the sample can be delivered to the ion probe can be in the nanoflow range.

The ion probe 14 is positioned relative to the aperture 18 such that its longitudinal axis A is substantially co-axial with an axis B passing through the aperture 18 and perpendicular to a plane thereof. In this manner, the ions generated by the ion probe 14 can be readily received by the aperture 18. In other words, the aperture 18 can receive the ions generated by the probe 14 at a rate substantially equal to the rate at which those ions are generated. When operating in the nanoflow regime, additional desolvating components can be located downstream from the curtain plate aperture, as described in U.S. Pat. No. 7,098,452. Hence, the axial positioning of the ion probe 14 relative to the aperture 18 results in high sensitivity due to the passage of a large fraction of ions generated by the probe 14 to the downstream components of a mass spectrometer in which the ion source is incorporated without, or at least with minimal, adverse effects on those downstream components.

With continued reference to FIGS. 1A, 1B, 1C, and 1D, the ion probe 16 is in turn positioned such that its longitudinal axis C is substantially orthogonal to the axis B that is orthogonal to the plane of the orifice 18 of the curtain plate 20. As noted above, the ion probe 16 is configured to accommodate sample flow rates higher than flow rates in the nanoflow range. The orthogonal positioning of the ion probe 16 relative to the orifice 18 of the curtain plate 20 can ensure that sufficient number of ions enter the aperture 18 while minimizing, and preferably eliminating, the passage of a large number of residual droplets through the aperture 18 to the downstream components of a mass spectrometer in which the ion source is incorporated. In some cases, a large number of solvated ions can be due to endogenous and excipient compounds present in the sample liquid stream.

In this embodiment, both the ion probe 14 and the ion probe 16 are fixedly (non-adjustably) positioned relative to the orifice 18 of the curtain plate 20. In other words, the positions of the ion probes, and more specifically the positions of their nozzles (i.e., exit orifices), are not adjustable relative to the orifice 18 of the curtain plate 20. More specifically, in this embodiment, an axial distance D1 between the nozzle 14*a* of the probe 14 and the orifice 18 of the curtain plate 20 is fixedly (non-adjustably) set in a range of about 0 millimeters (mm) to about 7 mm, e.g., about 1.9 mm. In some embodiments, the axial distance between the nozzle 14*a* (herein also referred to as the discharge end) of the probe 14 and the orifice 18 of the curtain plate 20 can be set with a tolerance of about 0.1 mm.

Further, in this embodiment, an axial distance D2 between discharge nozzle 16*a* of the probe 16 and the orifice 18 of the curtain plate 20 is fixedly (non-adjustably) set at about 5.5 mm. More generally, the axial distance D2 can be in a range of about 2 mm to about 10 mm. In some cases, the axial distance D2 is set with a tolerance of 0.1 mm. Further, in this embodiment, the orthogonal distance D3 between the nozzle 16*a* of the probe 16 and the axis B of orifice 18 of the curtain plate 20 can be set fixedly (non-adjustably) at about 15.9 mm. More generally, the axial distance D3 can be in a range of about 6 mm to about 25 mm.

As discussed in detail below, each ion probe 14/16 includes an emitter that extends by a fixed amount beyond the nozzle of the respective probe. The probes 14/16 can be any suitable probe that can be used for electrospray ionization (ESI) according to the present teachings. By way of example and with reference to FIG. 2A an exemplary ESI probe 200 includes a probe body 201 that extends from a proximal end (PE) to a distal end (DE).

Figure 2A:
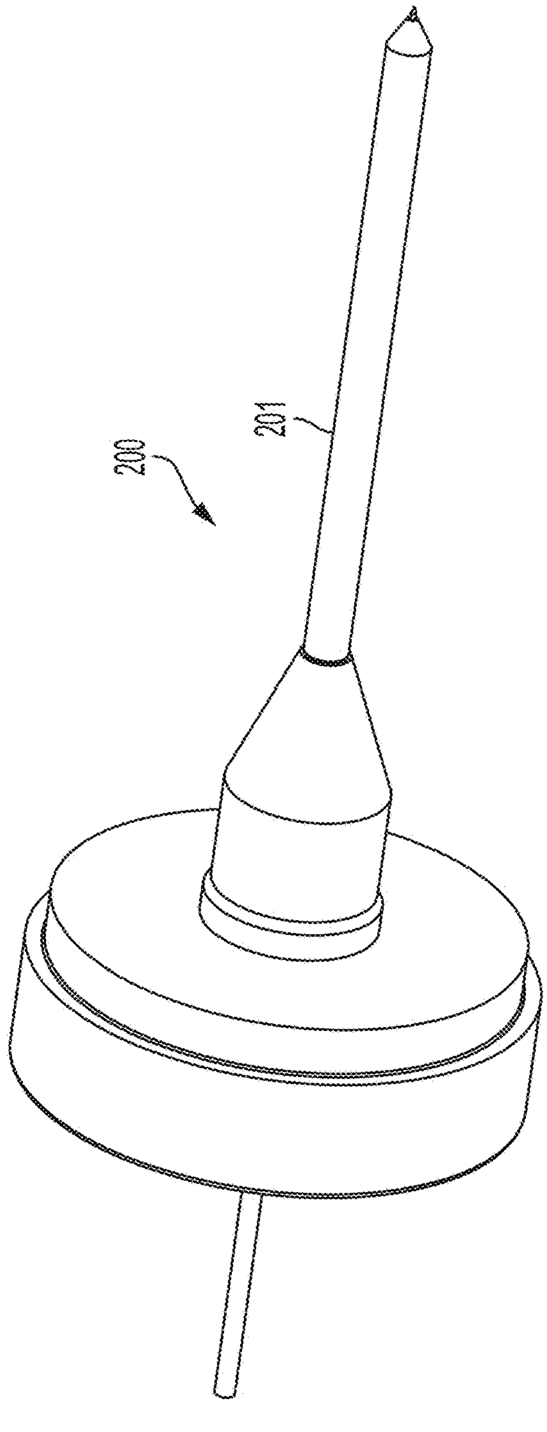
FIG. 2A is a schematic perspective view of a probe suitable for use in an ion source according to the present teachings.
Figure 2B:
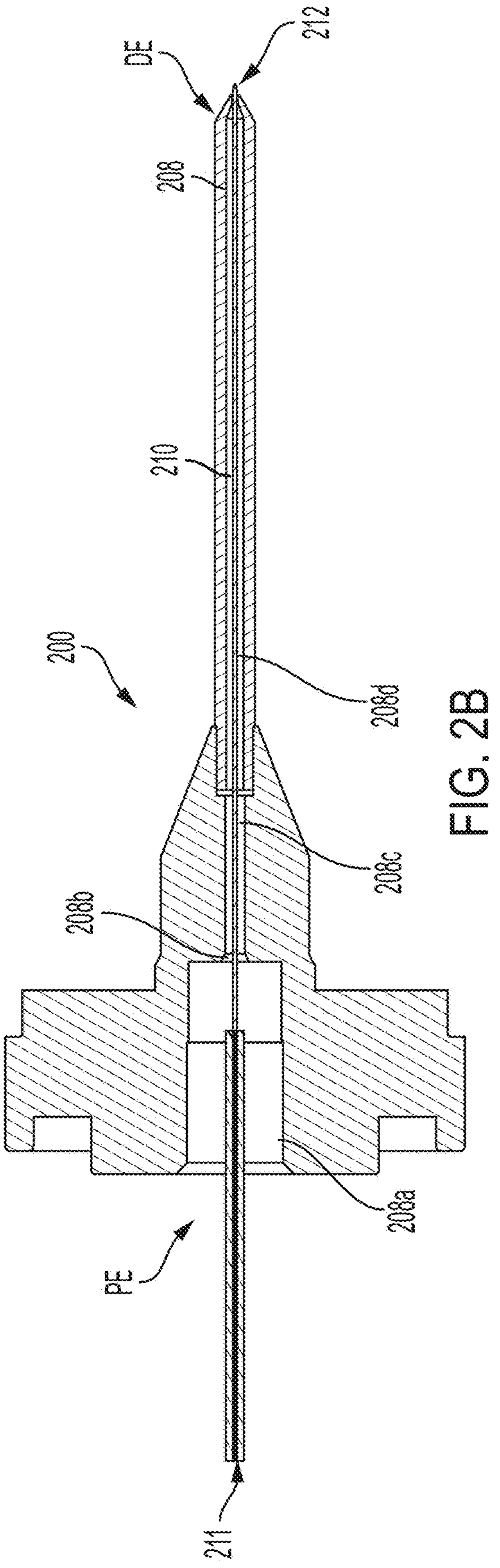
FIG. 2B is a schematic cross sectional view of the probe depicted in FIG. 2A.
Figure 2C:
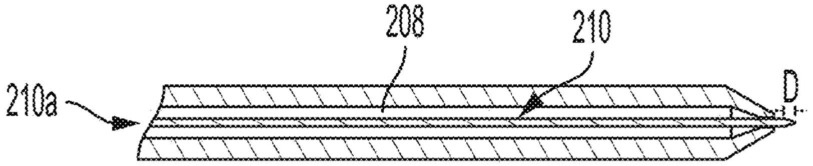
FIG. 2C is a partial schematic cross sectional view of the probe depicted in FIGS. 2A and 2B, FIG. 2D schematically depicts an ion source according to an embodiment in which one of the ion probes is disposed in one of the openings of the housing and the other opening of the housing is plugged, FIG. 2E schematically depicts an embodiment of an ion source in which only the ion probe accommodating flow rates above the nanoflow regime is coupled to the ion source's housing and the opening for receiving the other ion probe is plugged, FIG. 3 schematically depicts a mass spectrometer in which an ion source according to the present teachings is employed.

Referring to FIGS. 2A, 2B and 2C, the probe body 201 includes a channel 208 that extends from the proximal end (PE) to the distal end (DE) and in which an emitter 210 can be installed. The channel 208 includes an upper segment 208*a* that extends to a transition segment 208*b*, which in turn extends to lower segments 208*c* and 208*d*. In this embodiment, the portions of the probe body forming the upper segment 208*a* and the transition segment 208*b*, and the lower segment 208*c* of the channel 208 can be formed of a polymer, such as PEEK (poly ether ether ketone) while the portion of the probe body forming the lower segment 208*d* of the channel 208 can be formed of stainless steel.

The emitter 210 extends beyond the distal end (DE) of the probe body (herein also referred to as the discharge end of the probe) by a fixed (non-adjustable) amount (D). The emitter 210 includes a channel 210*a* (e.g., a microchannel) that extends from an entrance end 211 to an ionization discharge end 212 of the emitter. The ionization discharge end 212 of the emitter extends out of the probe by a fixed (non-adjustable) amount D relative to the distal end (DE) of the probe body. The fixed distance D can be, for example, in a range of about 0.1 mm to about 2 mm. By way of example, the fixed distance D for the probe accommodating sample flow rates in the nanoflow range can be about 0.9 mm, and the fixed distance D for the probe accommodating sample flow rates above the nanoflow range can be about 1.0 mm.

Figure 1B:
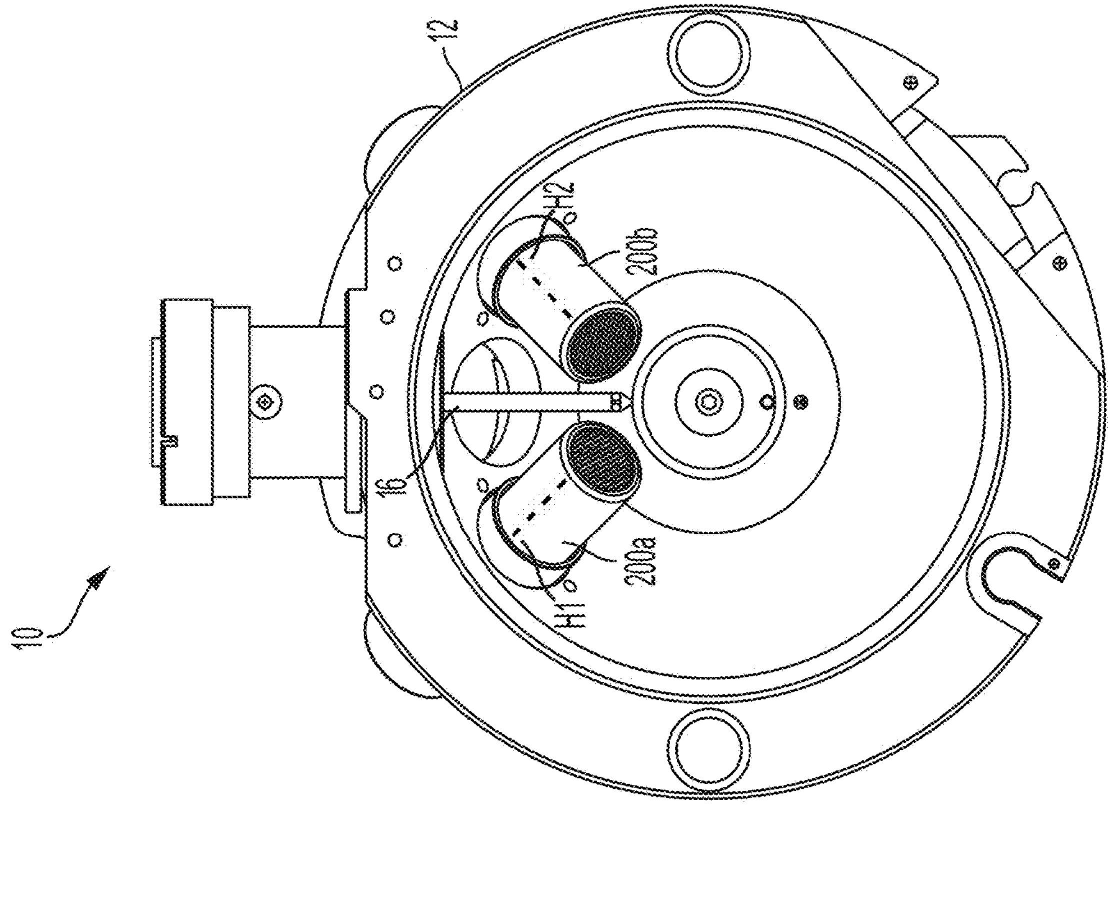
FIG. 1B is a schematic view of the ion source depicted in FIG. 1A showing the ion probe accommodating flow rates above the nanoflow range and two heaters disposed in the housing of the ion source.
Figure 1D:
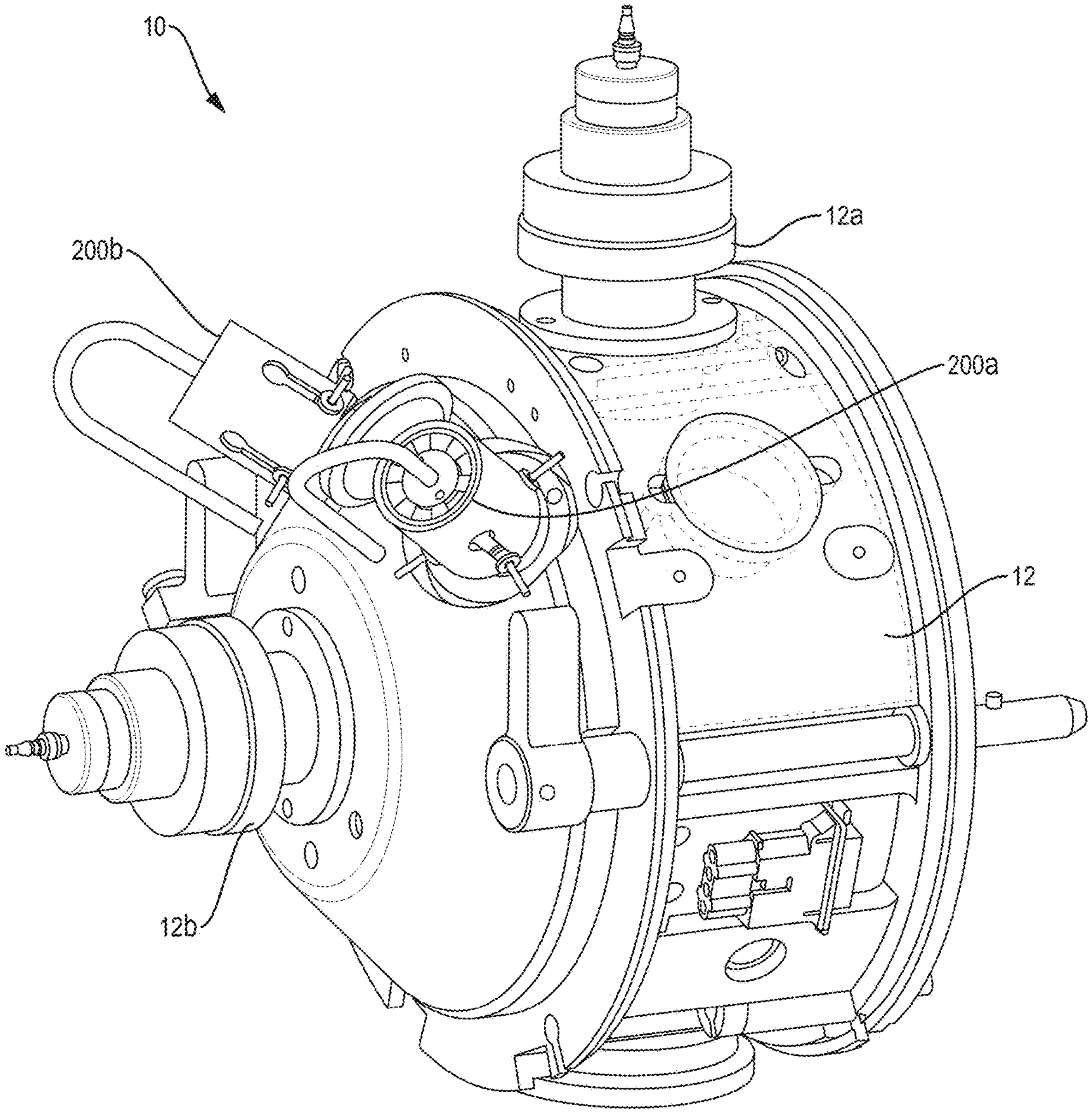
FIG. 1D is a schematic perspective view of the housing of an ion source according to an embodiment, where the housing includes two openings for coupling two ion probes independently to the housing.

Referring again to FIGS. 1A, 1B, and 1C, in this embodiment, the ion source 10 can further include two heaters 200*a* and 200*b* that are coupled to the ion source housing 12 and are configured to generate heat for causing the desolvation of the ions generated by the ion probes 14 or 16, preferably before those ions reach the orifice 18 of the curtain plate 20. In this embodiment, the heaters 200*a* and 200*b* in FIG. 1B are disposed non-coaxially relative to the probes 14/16. In particular, the longitudinal axis C of the probe 16 is not along longitudinal axes H1 and H2 of the heaters 200*a* and 200*b*. Alternatively, the heaters can also be utilized as a gas source to provide temperature control over the path taken by the sample. The heaters can act as simple gas source for cooling or a heated gas source for heating of the distal end (DE) of the probe body, discharge tip of the emitter 212 in FIG. 2B, sample path and the curtain plate 20. In some aspects, the heaters can be located in a plane parallel to the mirror plane (symmetry plane bisecting the angle between the two probes) of the two probes but offset by about 4 mm towards the higher flow probe 16 (above the nanoflow probe). The offset can offer wider control over the higher flow probe region. The heater arrangement can provide thermal control for both probes, both sample paths, and both flow regimes. It will be appreciated that the orientation of the plane containing the heaters and its location may vary to accommodate different source geometries and liquid flow regime splits to achieve a desired level of thermal control over the environment to which the sample is exposed prior to its entry to the sampling orifice of the mass spectrometer.

Figure 2D:
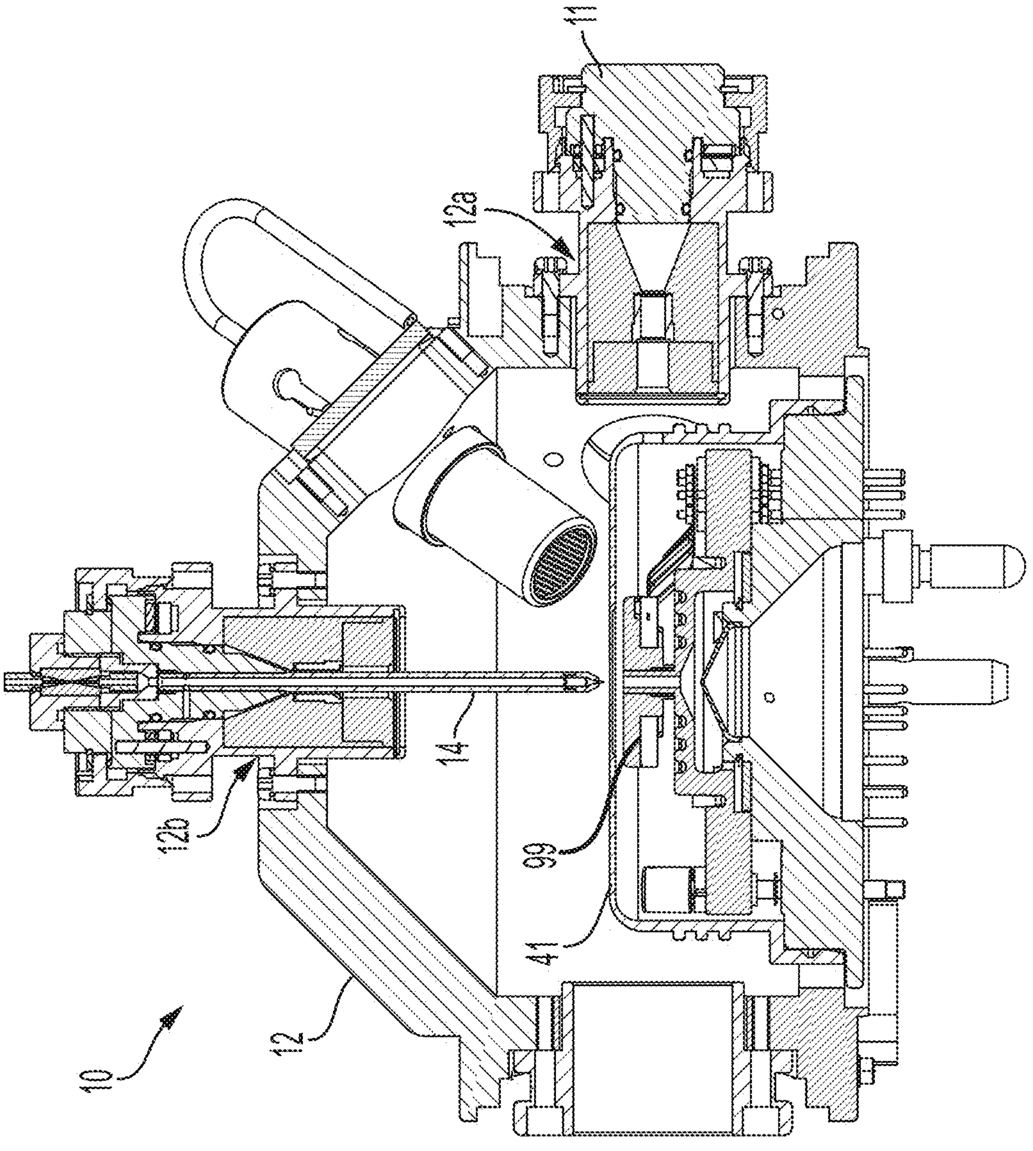

As noted above, in some embodiments, an ion source according to the present teachings can be operated with only one of the ion probes 14 and 16. For example, FIG. 2D schematically depicts such an embodiment in which the ion probe 14 is coupled to the ion source housing 12 via the port 12*b* and a plug 11 is employed to close off the port 12*a*, which is configured to receive the ion probe 16. In this manner, the ion source 10 is configured to operate with only the ion probe 14. By way of example, such a configuration can be useful in applications in which flow rates only in the nanoflow range are needed. FIG. 2D shows an additional heated element 99 located between the curtain plate 41 and the inlet of the mass spectrometer as described in U.S. Pat. Nos. 7,098,452 and 7,462,826, which are herein incorporated by reference.

Figure 2E:
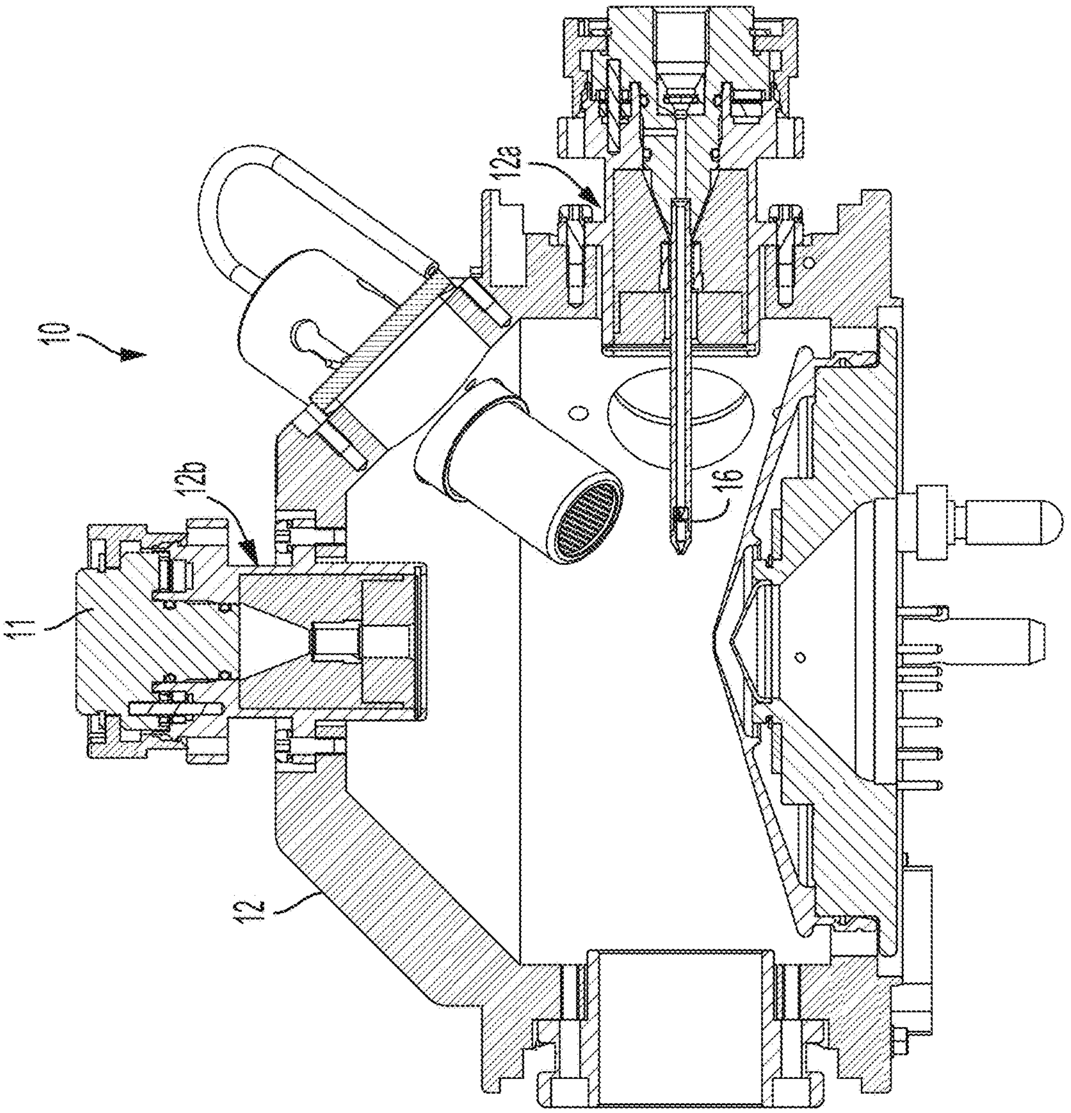

FIG. 2E schematically depicts another embodiment of the ion source 10 in which the ion probe 16 is coupled to the ion source housing 12 via the port 12*a* and a plug 11 is employed to close off the port 12*b*, which is configured to receive the ion probe 14. In this manner, the ion source 10 can be configured to operate with only the ion probe 16. By way of example, such a configuration can be useful in applications in which flow rates only above the nanoflow range are needed.

An ion source according to the present teachings can provide a number of advantages. In particular, the fixation of the emitter relative to the probe in which the emitter is incorporated such that the emitter extends beyond the probe's discharge tip by a fixed (non-adjustable) length can be advantageous. In conventional ion sources in which the protrusion of an emitter beyond the discharge tip of a probe can be adjusted by a user, the protrusion adjustment of the emitter can be quite tedious especially for flow rates above the nanoflow regime. In particular, in a conventional electrospray ion source, as the flow rate of a sample introduced into the ion source's probe changes, the flow rate of a nebulizer gas introduced into the probe as well as the heat generated by one or more heaters disposed in a chamber to which the ion source is coupled are adjusted to optimize ionization and desolvation of the sample. Further, the length of protrusion of the emitter beyond the discharge tip of the probe is also adjusted to further optimize the ionization of the sample. Moreover, in many such conventional systems, the position of the discharge tip of the probe relative to the heater(s) and an inlet port of the mass spectrometer in which the ion source is incorporated can also be adjusted. Significantly, in conventional ion sources, different flow rates require different protrusion lengths of the emitter beyond the discharge tip of the probe. The optimization of the ionization process via adjustment of the emitter relative to the probe's tip can be difficult and typically requires a great deal of experience to accomplish.

In contrast, in an ion source according to the present teachings, different probes are employed for flow rates in and above the nanoflow regime. It has been discovered that the use of different probes for accommodating such different flow rates allows fixing the emitter of an ion source relative to its probe, and particularly fixing the length by which the emitter protrudes beyond the probe's discharge tip. The use of different ion probes accommodating different sample flow rates and each having an emitter that is fixedly positioned within the probe advantageously eliminates the need for a user to adjust the emitter's position while allowing the use of different sample flow rates.

Figure 3:
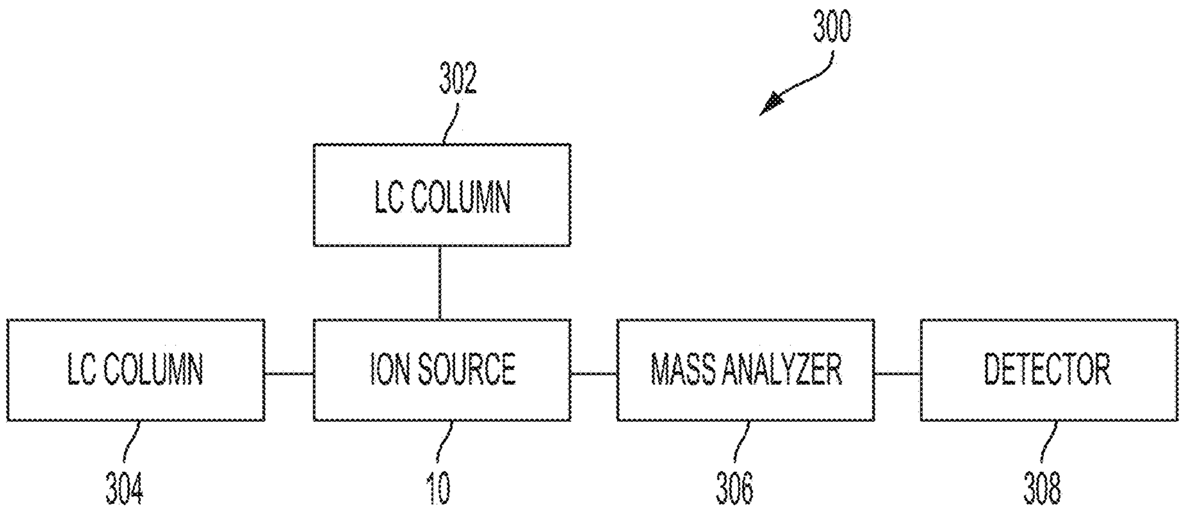

An ion source according to the present teachings can be incorporated in a variety of different mass spectrometers. By way of example, FIG. 3 schematically depicts a mass spectrometer 300 in which the ion source 10 is incorporated. As discussed above, the ion source 10 includes two ion probes 14 and 16 (not shown in this figure), one of which is configured to accommodate sample flow rates in the nanoflow regime and the other is configured to accommodate sample flow rates above the nanoflow regime.

In this embodiment, the ion source 10 is coupled to two LC columns 302 and 304, one which is configured to introduce a sample into the ion probe 14 at flow rates in the nanoflow range and the other is configured to introduce a sample into the ion probe 16 at flow rates above the nanoflow range. Each of the ion probes 14/16 can generate ions corresponding to at least one constituent of the sample introduced therein.

The desolvated ions are introduced into a downstream mass analyzer 306, e.g., via the orifice of a curtain plate of the analyzer as discussed above, which can analyze the ions based on their mass-to-charge (m/z) ratios. The ions passing through the mass analyzer can be detected by an ion detector 308. A variety of mass analyzers can be employed. For example, the mass analyzer 306 can be one or more quadrupole analyzers, time-of-flight analyzers, differential ion mobility analyzers, and any other mass analysis or ion mobility device. Further, the ion detector can be, for example, any combination of electron multiplier/electron multiplier-HED or other suitable detectors. In some embodiments, the mass analyzer 306 is a tandem analyzer that provides multiple stages of mass analysis. By way of example, the mass analyzer 306 can be an MS/MS analyzer having two quadrupole mass analyzers and a collision cell disposed between two quadrupole mass analyzers. In some embodiments, such an MS/MS analyzer can be operated in a multiple reaction monitoring (MRM) mode. For example, in such a mode, the first quadrupole analyzer can be configured to select precursor ions within a specified range of m/z ratios. The selected precursor ions can enter the collision cell and be fragmented due to collisions with a background gas. The second quadrupole mass analyzer can be configured to select fragment ions within a specified range of m/z ratios. In this manner, precursor/product ion pairs can be selectively detected.

In use, a sample can be introduced into one of the LC columns 302/304 and the eluant can be introduced into the ion probe that is fluidly coupled to that LC column. The ion probe can cause ionization of at least one constituent of the eluant received from the LC column. The ions can then be introduced into the downstream mass analyzer 306 to be analyzed based on their mass-to-charge (m/z) ratios. The ions passing through the mass analyzer 306 can be detected by the detector 308. In some embodiments, one probe can be attached and a plug can seal the other port.

In some embodiments, the electrical resistances of the probes as well as those of the plugs employed to close off the ports in the housing in which probes are not inserted can be employed to identify which probe, if any, is coupled to the housing. Further, such identification of the probe coupled to the housing can be utilized to supply appropriate power to the probe coupled to the housing. By way of example, in some such embodiments, a plug employed to close off a non-functional port (i.e., a port in which a probe is not inserted) can provide a short circuit of vanishing (zero) resistance. Further, the probe accommodating flow rates in the nanoflow range can be provided with an identification resistance (R1), e.g., in a range of about 0 Ohms to about 50 kOhms (such as 2.43 kOhms), and the probe accommodating flow rates above the nanoflow range can be provided with a different identification resistance (R2), e.g., in a range of about 0 Ohms to about 50 kOhms (such as 1.47 kOhms). The resistances of the probes can be connected in series. If the probe accommodating flow rates in the nanoflow range is inserted in one port of the housing with the other port closed off with a plug, the measured resistance will be R1, indicating that only the probe accommodating flow rates in the nanoflow range is coupled to the housing. On the other hand, if the probe accommodating flow rate above the nanoflow range is coupled to the housing, the measured resistance will be R2, indicating that only that probe is coupled to the housing. Further, if neither probe nor plugs are coupled to the housing, the measured resistance will indicate an open circuit. In such a case, a controller in communication with a device measuring the resistances will recognize that no probe is coupled to the housing and will inhibit application of voltages intended for the probes. Probe recognition is important because the software can set reasonable default values and typical high flow settings are sufficiently severe to damage a nanospray tip.

Figure 6:
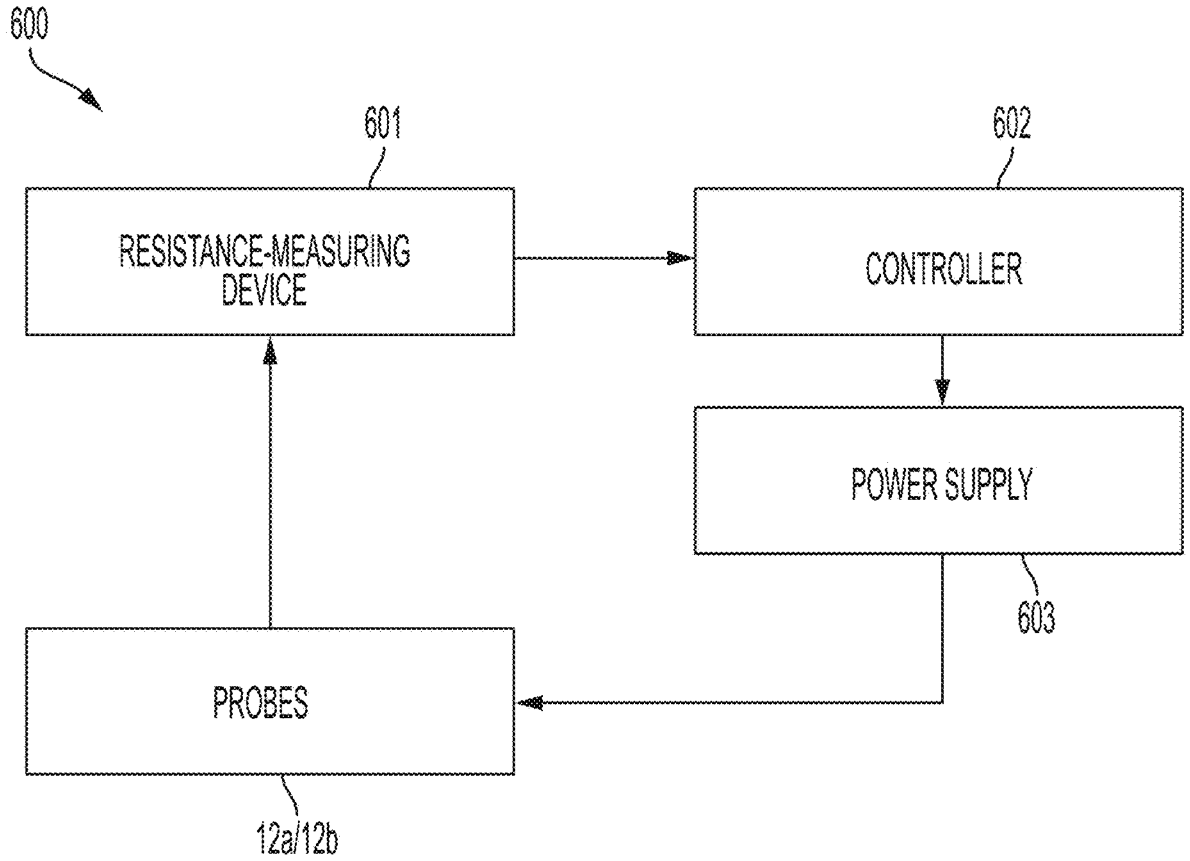

By way of example, FIG. 6 schematically depicts a system 600 for identifying which probe, if any, is coupled to the housing, and controlling the application of an appropriate voltage, if any, to the probe that is coupled to the housing. The system 600 includes a resistance-measuring device 601 for measuring the resistance across the openings in the housing 12*a*/12*b*. As noted above, if only the probe accommodating nanoflow rates is coupled to the housing with the other opening closed off with a plug, the resistance-measuring device 601 measures one resistance value (e.g., R1 as discussed above), and if the only the other probe is coupled to the housing with the other opening closed off, the resistance-measuring device 601 measures a different resistance (e.g., R2 as discussed above). Further, if neither probe nor plugs are coupled to the housing, the resistance-measuring device will measure an open circuit.

With continued reference to FIG. 6, a controller 602 receives the measured resistance values for the resistance-measuring device 601. The controller in turn controls a power supply 603 for adjusting voltages applied to the probe(s). For example, if the measured resistance value received by the controller indicates that only the probe accommodating flow rates in the nanoflow range is coupled to the housing, the controller 602 can cause the power supply 603 to apply an appropriate voltage to that probe (e.g. 3500 V). On the other hand, if the measured resistance value received by the controller indicates that only the probe accommodating flow rates above the nanoflow range is coupled to the housing, the controller 602 can cause the power supply 603 to apply an appropriate voltage to that probe (5500 V). Further, if the measured resistance value received by the controller indicates either a short circuit or an open circuit, the controller 602 can inhibit the power supply 603 from applying any voltages to the probes. The controller can also set default values for source heaters and gas flow rates based upon the measured resistance.

The following examples are provided to further elucidate various aspects of the present teachings, and is not intended to provide necessarily optimal ways of practicing the present teachings and/or optimal results that can be obtained.

Example 1

An LC-MS triple quadrupole mass spectrometer operating in MRM mode was used with two different electrospray ion sources to obtain peak area sensitivity data for a 6-compound mixture, where one of the ion sources was a conventional ion source in which the emitter's protrusion beyond the probe's discharge end was adjustable (herein referred to as "State of Art") and the other one was an electrospray ion source according to the present teachings in which the emitter was fixedly (non-adjustably) positioned within the ion probe. The flow rate was set at 200 μL/min.

The data for the State of Art source was obtained by first varying the position of the tip of the probe relative to the entrance aperture to the mass spectrometer, and by varying the emitter protrusion beyond the probe's discharge end to determine the overall optimal positions for the 6-compound mixture. Optimized data for each compound was then subsequently obtained by varying ion source temperature, ESI electrical potential, and gas flows on a compound-by-compound basis. For the ion source with the emitter fixedly positioned according to the present teachings, optimized data for each compound was obtained by varying ion source temperature, ESI electrical potential, and gas flows on a compound-by-compound basis.

Figure 4A:
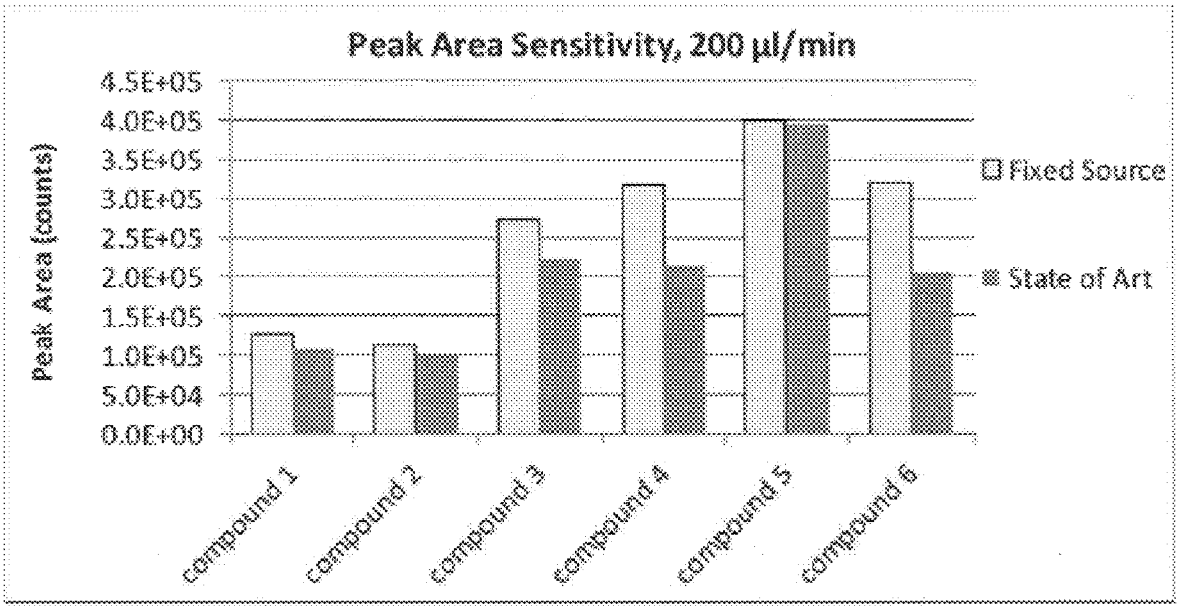
FIGS. 4A and 4B present peak area sensitivity and normalized peak area sensitivity data, respectively, for a plurality of compounds obtained using a conventional electrospray ion source having an adjustable probe and emitter and an electrospray ion source having a probe that is fixedly positioned relative to the ion source housing and an emitter that is fixedly positioned relative to an ion source's probe.
Figure 4B:
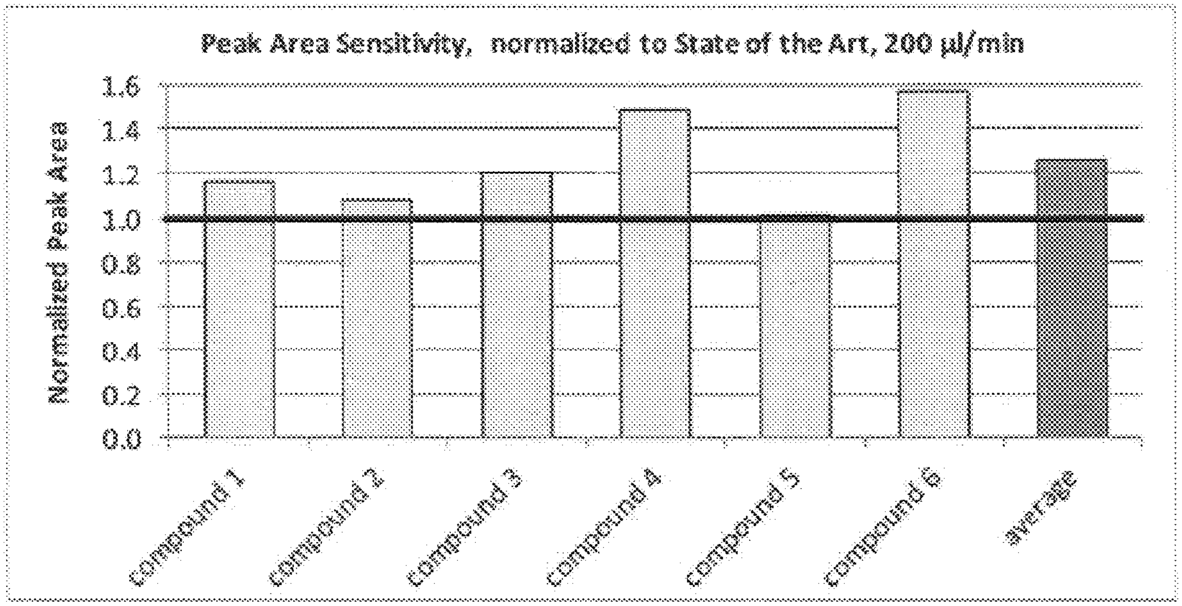

FIG. 4A presents a comparison of the peak area sensitivity data for the compounds. And FIG. 4B presents the normalized peak area sensitivity for each tested compound obtained using the electrospray ion source having a fixed emitter normalized relative to the peak area sensitivity obtained using the conventional electrospray ion source having an adjustable emitter. The data presented in FIGS. 4A and 4B show that peak area sensitivity obtained using the electrospray ion source having a fixed emitter is at least equal to a respective peak area sensitivity obtained using the electrospray ion source having an adjustable emitter, and in many cases, it is enhanced relative to the peak area sensitivity obtained using the electrospray ion source having an adjustable emitter. The adjustable emitter source was optimized for compound 5.

Example 2

Figure 5:
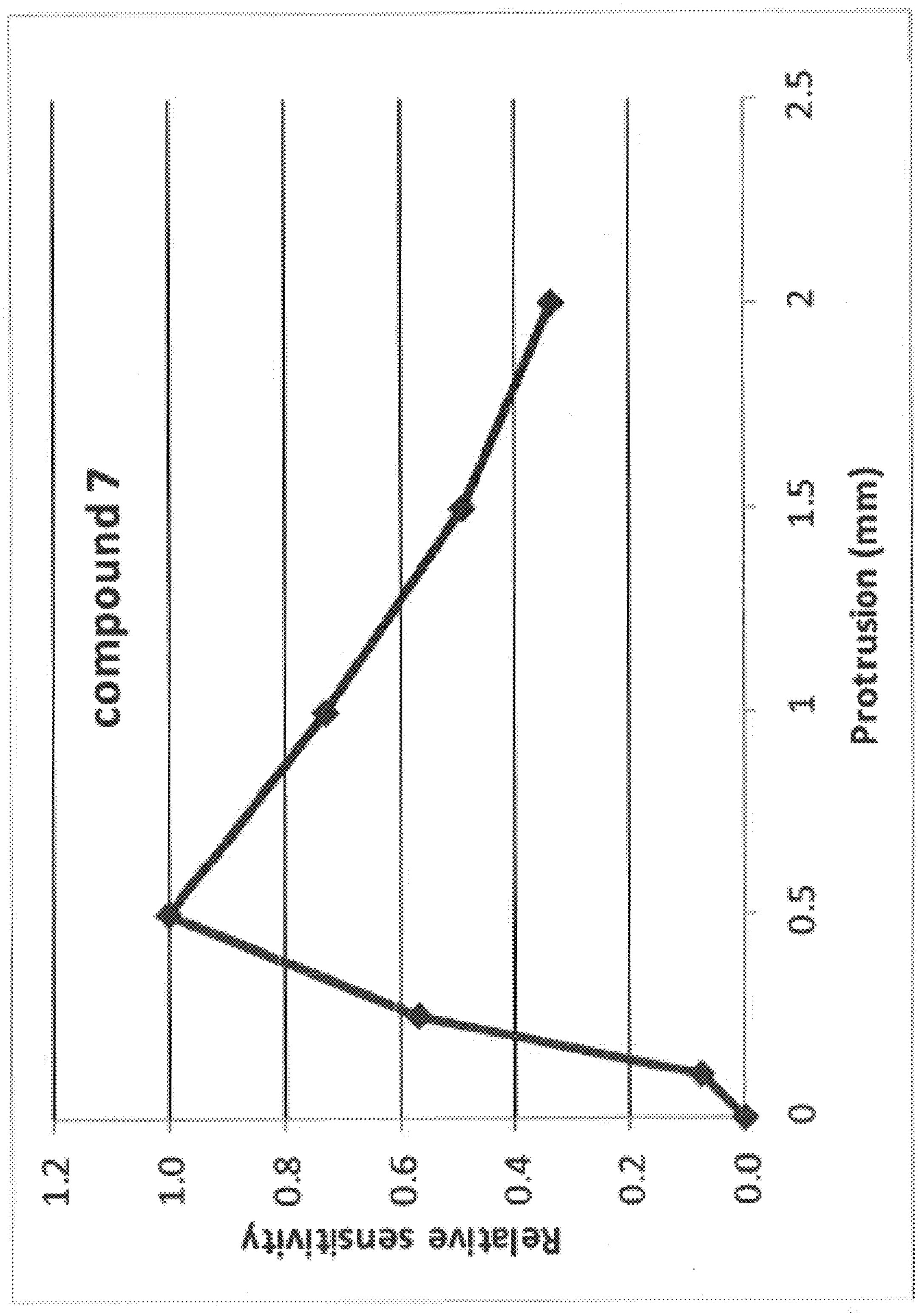
FIG. 5 presents data demonstrating the effect of protrusion of an emitter of an ion probe beyond the discharge tip of the probe, and FIG. 6 schematically depicts a system for identifying which ion probe, if any, is coupled to the housing of an ion source according to an embodiment of the present teachings.

FIG. 5 demonstrates the effect of the protrusion of an emitter beyond the discharge tip of a probe in which the emitter is incorporated, for a sample flow rate of 3 μliters/min. The infusion sensitivity for each protrusion length is normalized relative to the maximum sensitivity for the single compound in use. The infusion sensitivity rapidly increases to a peak at a protrusion length of about 0.5 mm and then decreases as the infusion length further increases. Significant sensitivity decreases are evident when the protrusion length varies by as little as 0.5 mm from the optimal length. FIG. 5 was generated with a fixed nebulizer gas setting which gave a smaller optimal protrusion than typical.

Those having ordinary skill in the art will appreciate that various changes to the above embodiments can be made without departing from the scope of the invention.

What is claimed is:

1. A process for ionizing a sample, comprising:

providing a first electrospray ion probe configured for accommodating a sample flow rate in nanoflow range, said probe having a first emitter for ionizing said sample, providing a second electrospray ion probe configured for accommodating a sample flow rate in a range above said nanoflow range, said probe having a second emitter for ionizing said sample, wherein the emitter of each of said ion probes is fixedly positioned relative to a discharge tip of the ion probe, measuring electrical resistance across a first and second openings of an ion source, into which the first and second electrospray ion probes are configured to be coupled, receiving values of the measured electrical resistance, determining if any of said first and second probes is respectively coupled into the first and second openings, introducing a sample into one of said first or second ionization probes, and activating one or more of the first and second emitters of the first and second ionization probes, powered according to the determining if any of said first and second probes is coupled to the respective first and second openings, so as to ionize at least a constituent of said sample.

2. The process of claim 1, wherein said first and second ion probes are coupled to a mass analyzer via an orifice of a curtain plate.

3. The process of claim 1, wherein said first and second probes are fixedly positioned relative to said orifice of the curtain plate.

4. The process of claim 1, further comprising plugging said first and second openings when an ion probe is not coupled to that opening.

5. The process of claim 1, further comprising identifying one of said openings to which an ion probe is not coupled.

6. An ion source for use in a mass spectrometry system, comprising:

a housing providing first and second openings, wherein the first opening is configured for coupling a first ion probe accommodating sample flow rates in a nanoflow regime to the housing and the second opening is configured for coupling a second ion probe accommodating sample flow rates above nanoflow range to the housing, each of said ion probes comprising a discharge tip for ionizing at least a constituent of a sample received by said probe, wherein each of said probes comprises an emitter fixedly positioned relative to a discharge tip of the probe, and circuitry comprising a resistance-measuring device for measuring electrical resistance across said first and second openings, and a controller for receiving values of said measured electrical resistance and processing said received resistance values to determine if any of said first and second probes is coupled to the respective first and second openings.

7. The ion source of claim 6, wherein said two openings are configured such that said first and second probes are disposed at an angle relative to one another.

8. The ion source of claim 7, wherein said angle is about 90 degrees.

9. The ion source of claim 6, wherein said housing and said probes are configured such that the probes can be interchangeably disposed in said housing.

10. The ion source of claim 6, further comprising at least one heater disposed in said housing.

11. The ion source of claim 10, wherein the at least one heater comprises first and second heaters disposed non-coaxially relative to a longitudinal axis of at least one of said first and second probes.

12. The ion source of claim 11, wherein said first and second heaters and said at least one probe are arranged in a non-coplanar manner.

13. The ion source of claim 6, wherein said ion source is configured for interfacing with a curtain plate of a mass spectrometer, wherein said curtain plate comprises an orifice through which at least a portion of the ions generated by any of said first and second ion probes enters downstream components of the mass spectrometer.

14. The ion source of claim 13, wherein said first opening of the housing and said first probe are configured such that said first probe is positioned in the housing such that a longitudinal axis thereof is substantially co-axial with a central axis associated with an orifice of said curtain plate.

15. The ion source of claim 14, wherein said second opening of the housing and said second probe are configured for positioning said probe in the housing such that a longitudinal axis thereof is substantially orthogonal to said orifice axis.

16. The ion source of claim 6, wherein said first and second openings of the housing are configured for positioning said first and second ion probes in the housing such that discharge tips thereof are non-adjustably disposed relative to said orifice of the curtain plate.

17. The ion source of claim 6, wherein said ion source is operable with any of said first or said second probe.

18. The ion source of claim 6, wherein said ion source is operable with at least one of said first and second ion probes.

19. The ion source of claim 6, wherein any of said first and second ion probe is an electrospray ion probe.

20. The ion source of claim 19, wherein said electrospray ion probe comprises a nebulization assist.

21. The ion source of claim 6, further comprising at least one cap having a resistive element for plugging at least one said openings in absence of an ion probe being coupled to that opening.

22. The ion source of claim 21, wherein said circuitry is configured to measure resistance of said resistive element for determining whether said opening is plugged.

23. The ion source of claim 6, wherein the source housing is sealed and comprises an actively pumped exhaust for removing gaseous by-products.

24. A mass spectrometer system, comprising:

an ion source for generating ions, a curtain plate having an orifice for receiving at least a portion of said ions, and one or more mass analyzers disposed downstream of said orifice of the curtain plate, wherein said ion source comprises:

a housing providing first and second openings, wherein the first opening is configured for coupling a first ion probe accommodating sample flow rates in a nanoflow regime to the housing and the second opening is configured for coupling a second ion probe accommodating sample flow rates above nanoflow range to the housing, each of said ion probes comprising an emitter for ionizing at least one constituent of a sample flowing through the ion probe, wherein the emitter of each of said ion probes is fixedly positioned relative to a discharge tip of the ion probe, and circuitry comprising a resistance-measuring device for measuring electrical resistance across said first and second openings, and a controller for receiving values of said measured electrical resistance and processing said received resistance values to determine if any of said first and second probes is coupled to the respective first and second openings.

25. The mass spectrometer of claim 24, wherein said openings of the housing are configured such that said ion probes can be positioned in the housing such that a discharge tip of each probe is positioned non-adjustably relative to said orifice of the curtain plate.

26. The mass spectrometer of claim 24, wherein the controller is further configured to:

activate one or more of the emitters of the respective first and second probes, powered according to determining if any of said first and second probes is coupled to the respective first and second openings, so as to ionize at least a constituent of said sample.

27. The ion source of claim 6, wherein the controller is further configured to:

activate one or more of the emitters of the respective first and second probes, powered according to determining if any of said first and second probes is coupled to the respective first and second openings, so as to ionize at least a constituent of said sample.

* * * * *